US012718464B2

(12) United States Patent
Fujieda et al.

(10) Patent No.: US 12,718,464 B2
(45) Date of Patent: Aug. 25, 2026

(54) NEURAL NETWORK-BASED RAY TRACING

(71) Applicant: Advanced Micro Devices, Inc., Santa Clara, CA (US)

(72) Inventors: Shin Fujieda, Tokyo (JP); Takahiro Harada, Santa Clara, CA (US); Chih-Chen Kao, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 509 days.

(21) Appl. No.: 18/345,538

(22) Filed: Jun. 30, 2023

(65) Prior Publication Data

US 2025/0005842 A1 Jan. 2, 2025

(51) Int. Cl.
*G06T 15/06* (2011.01)

(52) U.S. Cl.
CPC .................................... *G06T 15/06* (2013.01)

(58) Field of Classification Search
CPC ...................................................... G06T 15/06
See application file for complete search history.

(56) References Cited

U.S. PATENT DOCUMENTS

2024/0203033 A1* 6/2024 Pankratz ................ G06T 15/80
2024/0203034 A1* 6/2024 Pankratz ................ G06T 15/06
2024/0412445 A1* 12/2024 Pankratz ................ G06T 15/06

OTHER PUBLICATIONS

Kuznetsov, A., et. al., "NeuMIP: Multi-Resolution Neural Materials", ACM Transactions on Graphics, vol. 40, No. 4, Article 175, Aug. 2021, 13 pgs.
Müller, T., et. al., "Instant Neural Graphics Primitives with a Multiresolution Hash Encoding", ACM Transactions on Graphics, vol. 41, No. 4, Article 102, Jul. 2022, 15 pgs.

* cited by examiner

*Primary Examiner* — Phuc N Doan
(74) *Attorney, Agent, or Firm* — Volpe Koenig

(57) ABSTRACT

A technique for performing ray tracing operations is provided. The technique includes traversing a bounding volume hierarchy for a ray to arrive at a bounding box without use of a neural network; perform a feature vector lookup using modified polar coordinates characterizing the ray relative to the bounding box to obtain a set of feature vectors; and obtaining output with the neural network using the set of feature vectors.

20 Claims, 8 Drawing Sheets

NEURAL NETWORK-BASED RAY TRACING

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes traversing a bounding volume hierarchy for a ray to arrive at a bounding box without use of a neural network; performing a feature vector lookup using modified polar coordinates characterizing the ray relative to the bounding box to obtain a set of feature vectors; and obtaining output with the neural network using the set of feature vectors.

Figure 1:
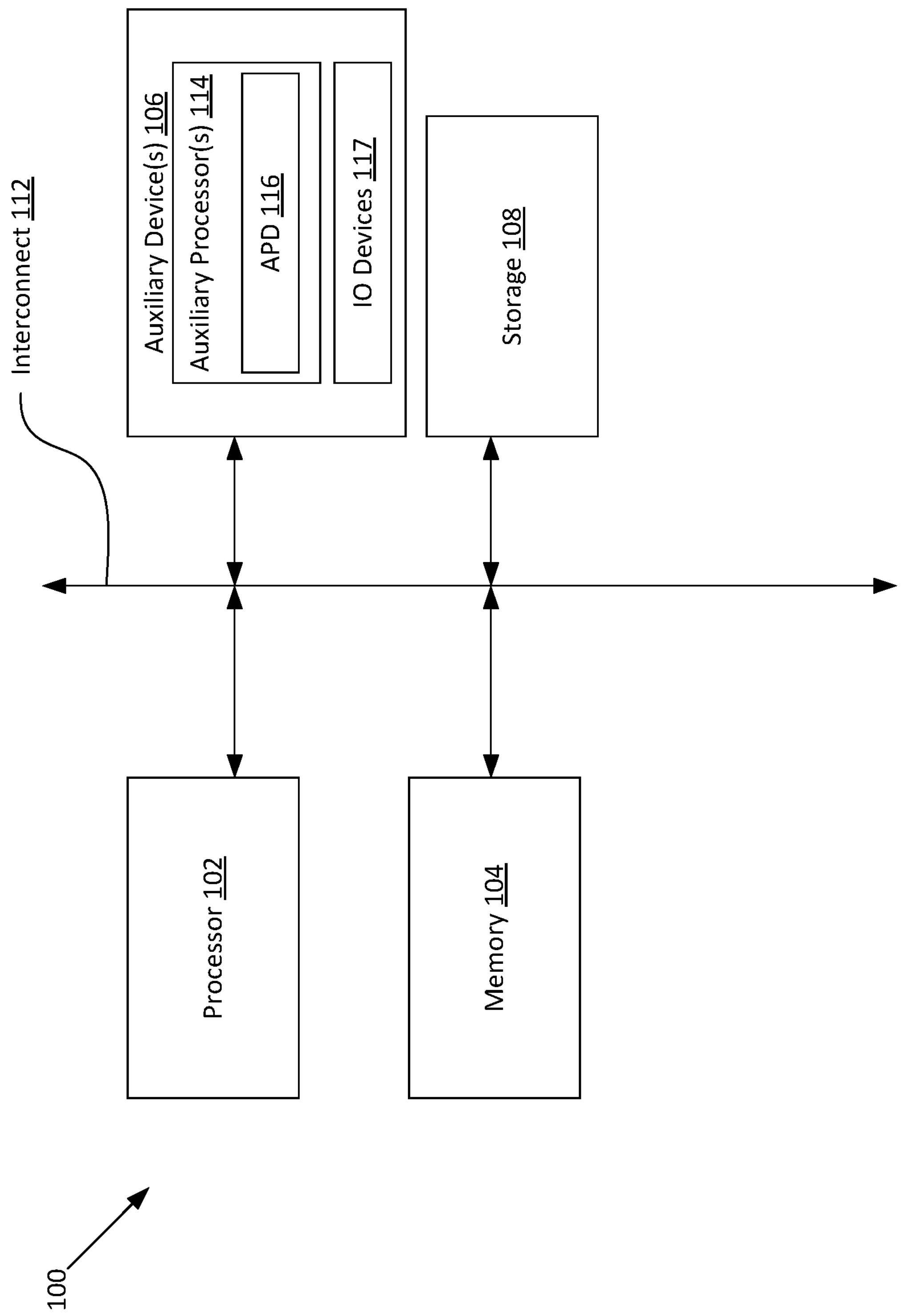
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices 117. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary processors 114 include an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch-pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
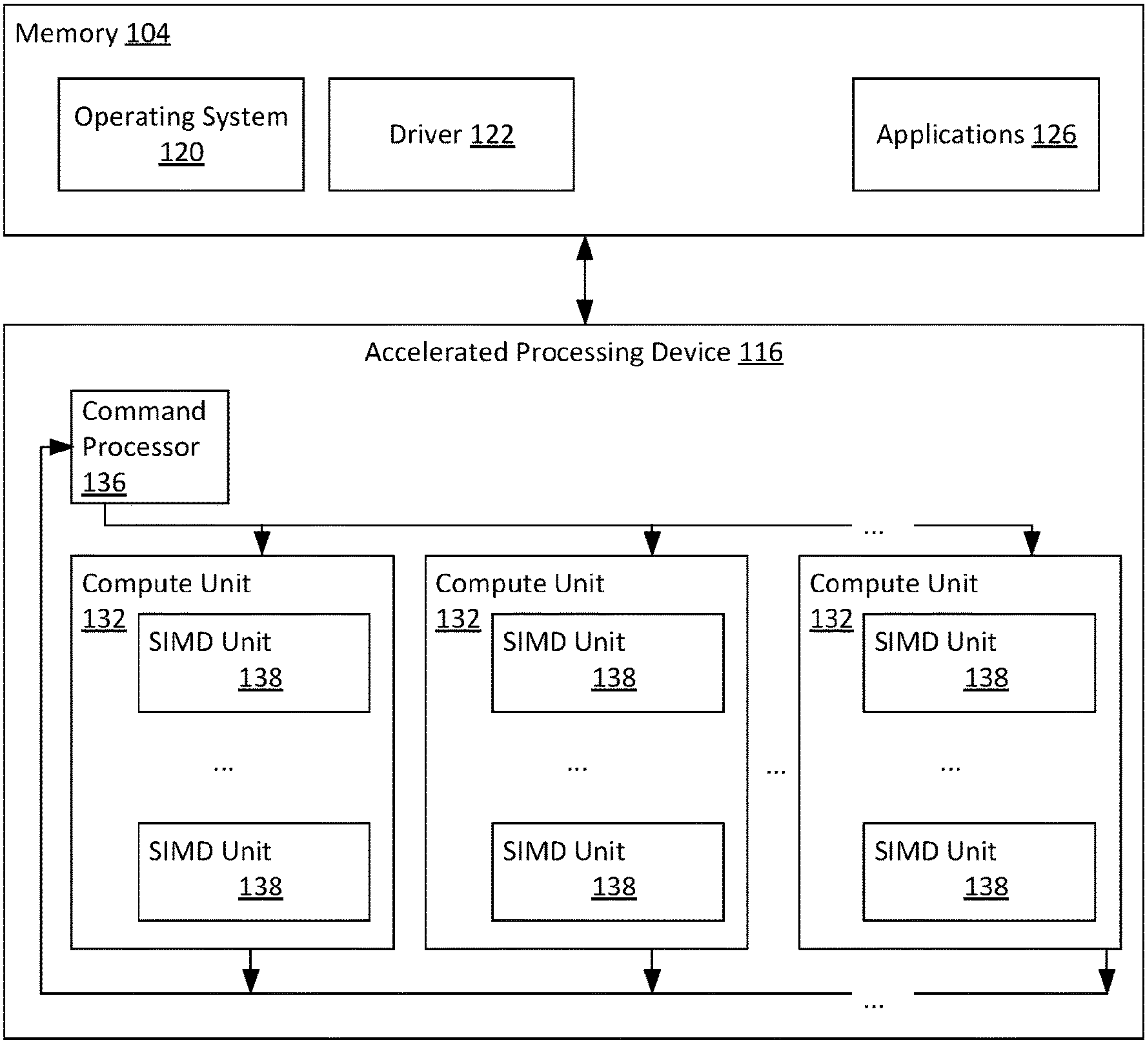
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "workgroup," which includes a collection of work-items designated to execute the same program. A workgroup is executed by executing each of the wavefronts that make up the workgroup. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A command processor 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
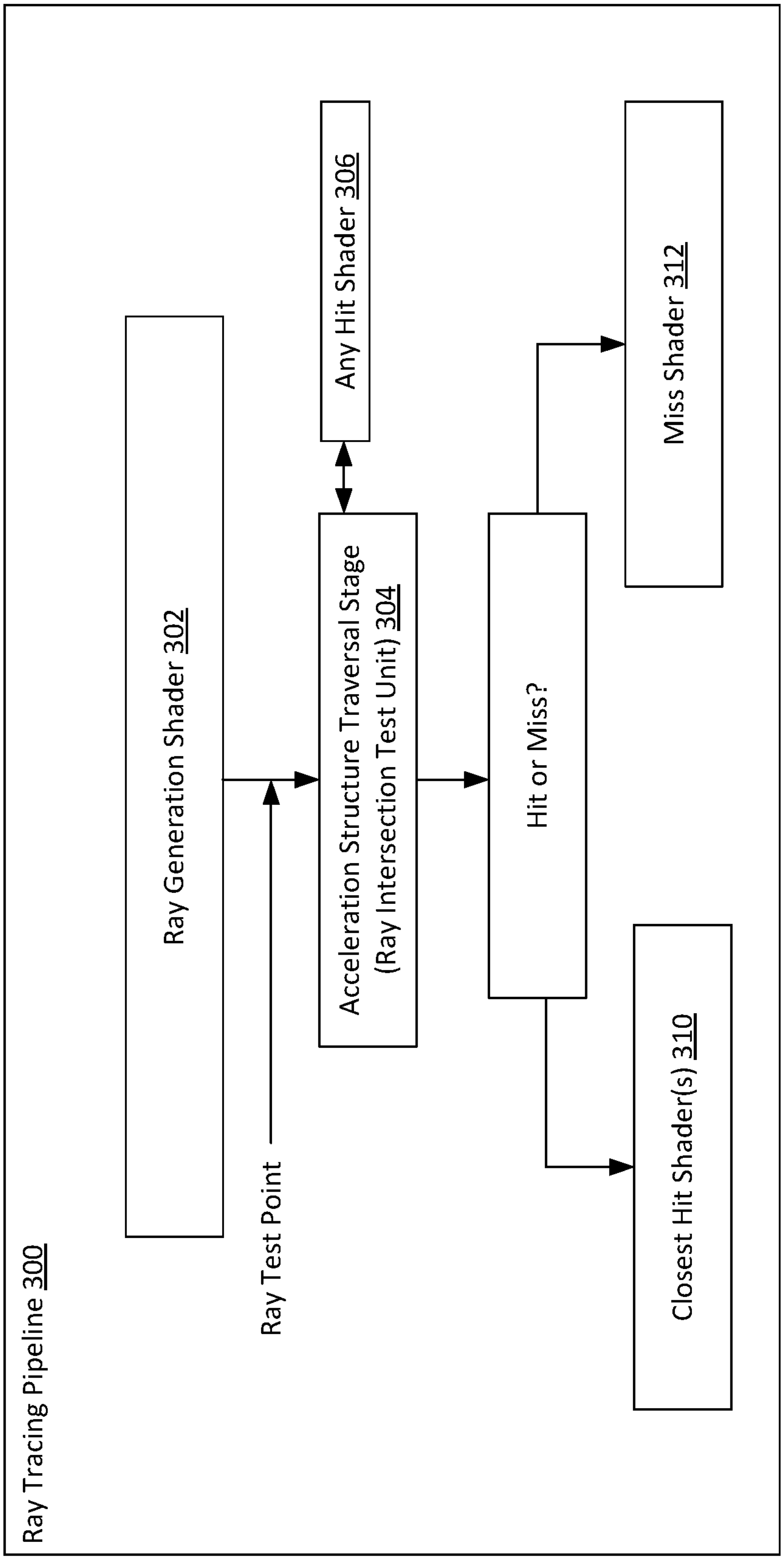
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122) or by code provided by some entity other than an application. The acceleration structure traversal stage 304 performs a ray intersection test to determine whether a ray hits a triangle.

The various programmable shader stages (ray generation shader 302, any hit shader 306, closest hit shader 310, and miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the command processor 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The acceleration structure traversal stage 304 determines whether the results of the acceleration structure traversal stage 304 (which may include raw data such as barycentric coordinates and a potential time to hit) actually indicate a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. Regarding determining whether the results indicate a hit or a miss, the acceleration structure traversal stage 304 triggers execution of a closest hit shader 310 for the triangle closest to the origin of the ray that the ray hits, or, if no triangles were hit, triggers a miss shader 312.

Note, it is possible for the any hit shader 306 to "reject" a hit from the ray intersection test unit 304, and thus the acceleration structure traversal stage 304 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a background image. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for the closest hit shader 310 or the miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves casting a ray from an origin and determining whether the ray hits a triangle and, if so, what distance from the origin the triangle hit is at. For efficiency, the ray intersection test uses a representation of space referred to as a bounding volume hierarchy. This bounding volume hierarchy is the "acceleration structure" described above. In a bounding volume hierarchy, each non-leaf node represents an axis-aligned bounding box that bounds the geometry of all children of that node. In an example, the base node represents the maximal extents of an entire region for which the ray intersection test is being performed. In this example, the base node has two children that each represent axis-aligned bounding boxes that subdivide the entire region. Note that the value of two for the number of children is just an example and that non-leaf nodes can have a different number of children than two. Each of those two children has two child nodes that represent axis aligned bounding boxes that subdivide the space of their parent, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
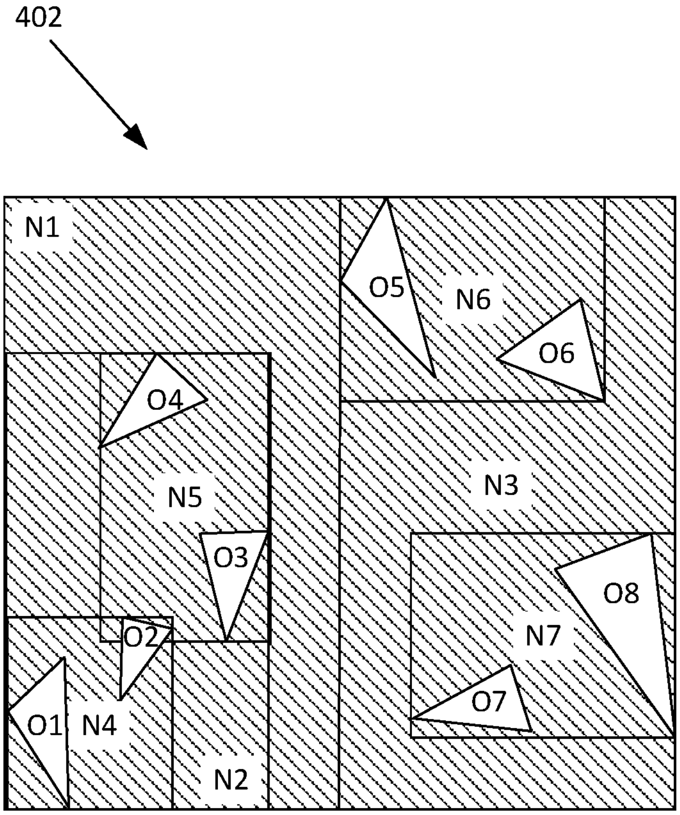
FIG. 4 is an illustration of a bounding volume hierarchy, according to an example.
Figure 4:
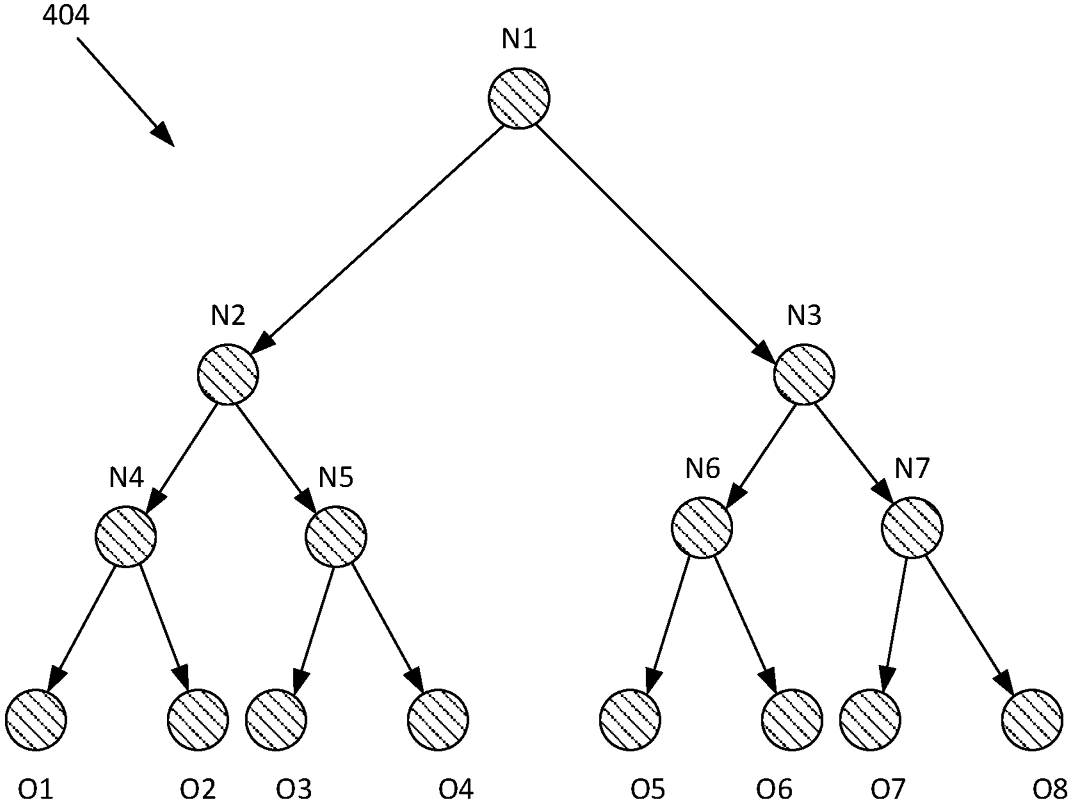

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the top of FIG. 4 and the tree representation 404 of the bounding volume hierarchy is illustrated in the bottom of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. In this example, the test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed. Note that rays can have a variety of directions and can have an origin in a variety of locations. Thus, the specific boxes eliminated or not eliminated would depend on the origin and direction of the rays. However, in general, testing the rays for intersection with boxes eliminates some leaf nodes from consideration.

Figure 5:
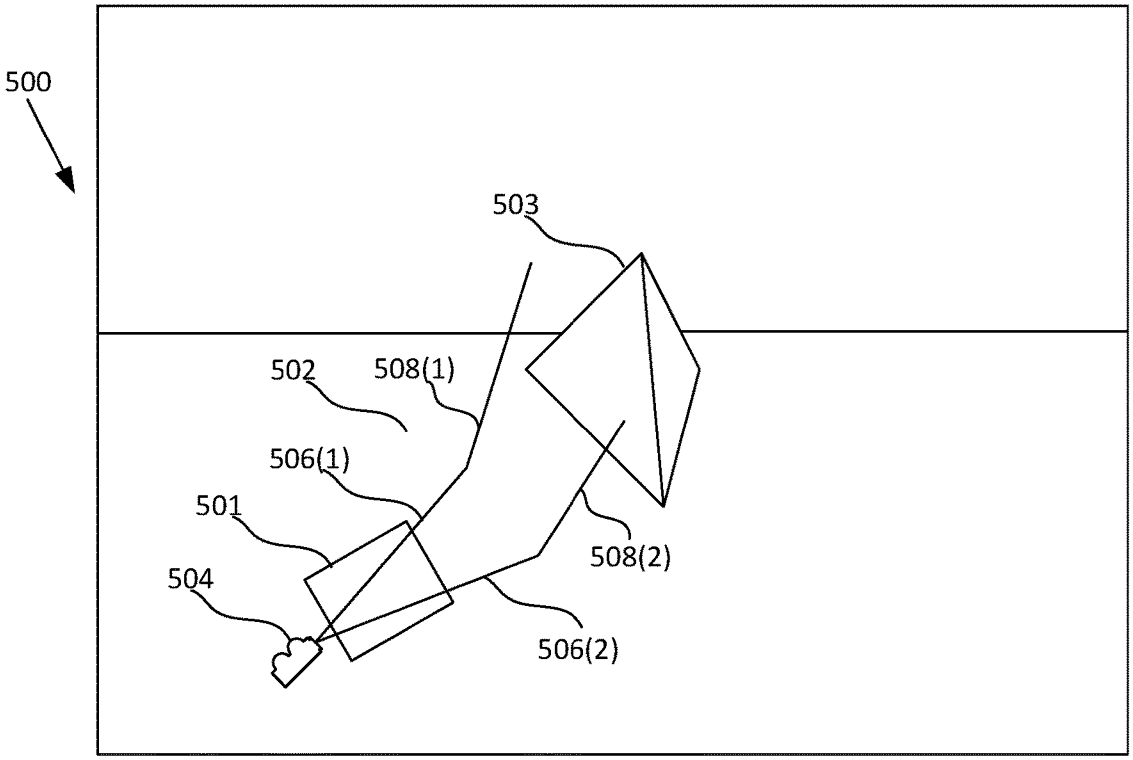
FIG. 5 illustrates an example scene that illustrates operations related to generating a shadow map.

It is possible to use machine learning to perform at least some ray tracing operations. In an example, machine learning can be used to generate a shadow map, which is a grayscale image where the luminance of any given pixel depends on the intensity of the light sources incident on a surface at a point corresponding to a pixel. FIG. 5 illustrates an example scene 500 that illustrates operations related to generating a shadow map.

Figure 6:
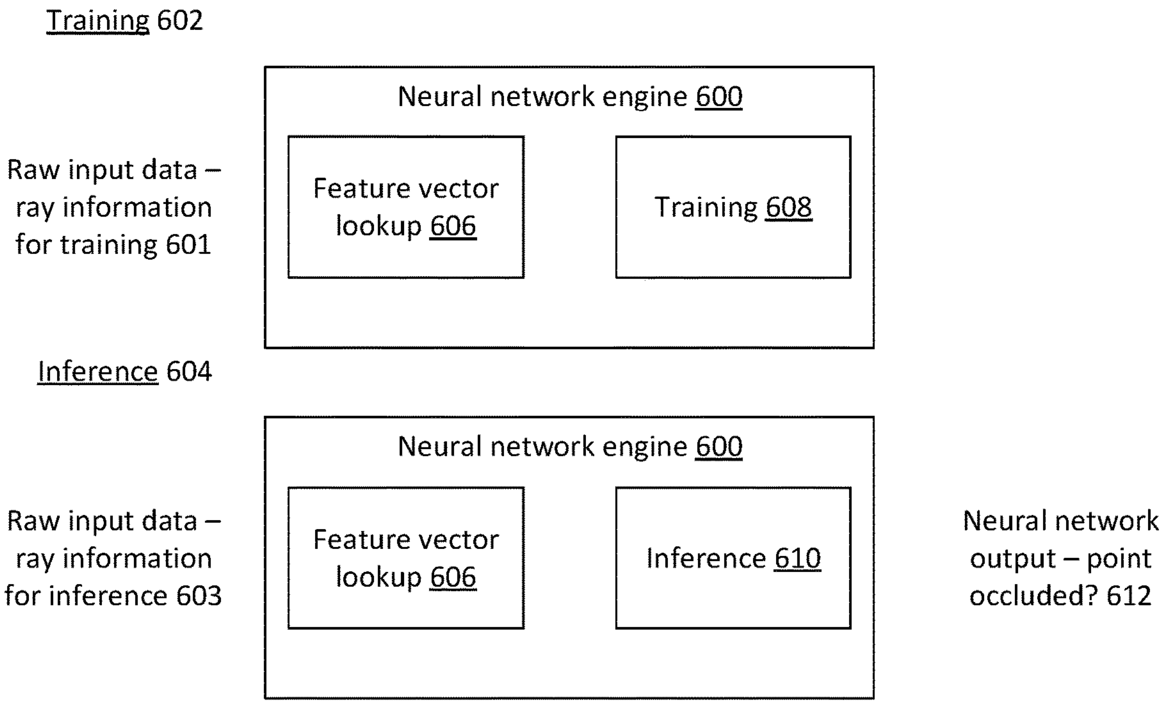
FIG. 6 illustrates operations of a neural network engine for performing machine learning-based ray tracing operations, according to an example.

To generate a shadow map, a ray tracer (which is, in various examples, a neural network engine 600 of FIG. 6, the ray tracing pipeline 300, a combination thereof, or any other technically feasible entity) casts camera rays from a camera 504. A plurality of rays is cast from the camera 504. For any given camera ray, the camera ray is cast through an image plane 501 that corresponds to a final rendered image. The position through which the camera ray passes through the image plane corresponds to the pixel in the image for which the color is being determined by the ray. If the camera ray 506 intersects an object (e.g., surface 502 or object 503), then the point of intersection of the camera ray with the object is the primary intersection point. If the camera ray 506 intersects an object, then the ray tracer casts additional secondary rays 508 (e.g., using the ray test point of FIG. 3) with an origin at the point of intersection. In some examples, the ray tracer determines an intensity for the pixel associated with the camera ray by determining the percentage of secondary rays that are occluded (intersect another object) over the total number of secondary rays. In essence, this percentage indicates the intensity of ambient light incident on the primary intersection point, which indicates the greyscale intensity with which to display the pixel associated with the camera ray 506. In other examples, more complex techniques are used. In examples, such techniques utilize additional "bounce points" and/or additional operations to generate the shadow map with very fine detail and/or to meet other goals. In summary, a shadow map technique involves a ray tracer (e.g., the ray tracing pipeline 300) determining an illumination intensity to apply to different portions of an image by generating secondary (or "bounce") rays 508 from the points of intersection of camera rays 506 with objects (e.g., object 502) and by determining whether the bounce rays 508 are occluded, which involves determining whether those bounce rays 508 intersect with another object.

Typical ray tracing workloads exhibit a high degree of divergent control flow. More specifically, rays are typically represented with one work-item each. Such work-items test a ray for intersection with a collection of objects by traversing through a bounding volume hierarchy. Divergence occurs when different work-items need to execute different types of workloads. In an example, within a single wavefront, one work-item is still traversing through non-leaf nodes and another work-item has determined that intersection with a leaf node has occurred and thus that work-item would need to execute a particular shader (e.g., an any hit shader), which, at least in some implementations, cannot be executed at the same time, which leads to divergence. In another example, many work-items of a wavefront have already completed traversal of a BVH while other work-items have not, leading to divergence. For at least these reasons, techniques are provided herein for using a machine learning, neural network-based technique to generate shadow maps. Both inference and training have a much less divergent workflow that consists of sequences of matrix multiplication operations, alleviating the issues associated with the divergent control flow of "traditional" ray tracing operations.

FIG. 6 illustrates operations of a neural network engine 600 for performing machine learning-based ray tracing operations, according to an example. The neural network is trained, during training 602, to classify bounce rays (identified by the raw input data 601) as either being occluded (intersecting at least one object of a scene) or as not being occluded (not intersecting any object of the scene). During inference 604, the trained neural network engine 600 classifies a ray (identified by raw input data 603) as either occluded or not occluded.

To perform training, the neural network engine 600 performs a feature vector lookup 606 and training 608. The feature vector lookup includes performing operations to obtain a feature vector based on the raw input data for the ray information for training 601. The feature vector lookup 606 includes converting the raw input data, which characterizes the input ray, into a modified version of that data and then performing a lookup using that modified version of the data to obtain a feature vector. This feature vector is then used as input to a neural network for training 608. This training trains feature vectors from the feature vector lookup 606, itself. The training also trains the weights of the neural network.

For inference 604, the neural network engine 600 accepts the raw input data that includes ray information for inference 603, which has the same form as that for training 601 (i.e., the raw input data 603 includes information characterizing a bounce ray). The neural network engine 600 performs a feature vector lookup 606 using the raw input data 603 to obtain a feature vector in a similar way as with training 602. Then the neural network engine 600 performs inference 610 using the neural network to obtain an output 612 that indicates whether the ray is occluded (i.e., intersects an object).

In some examples, the neural network that is used, and the feature vector lookup that is performed are based on whether the origin of the bounce ray is within the bounding box that surrounds the geometry being queried for intersection. That is, there is a separate feature vector lookup and neural network for two situations: the situation where the origin of the bounce ray is within that bounding box and the situation where the origin is external to or on the bounding box. In some examples, the bounding box mentioned is the bounding box 804 of FIG. 8A, discussed below. Thus, in some examples, before performing the feature vector lookup 606, the neural network engine 600 determines whether the origin of the bounce ray is within that bounding box and selects a feature vector lookup mode and neural network for inference or training. The feature vector lookup mode determines which feature vector lookup to perform (e.g., which set of grids 900, see FIG. 9).

Figure 7:
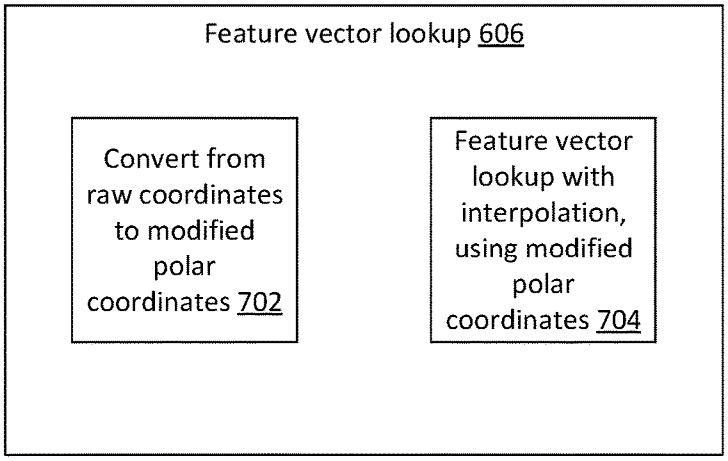
FIG. 7 illustrates the feature vector lookup, according to an example.

FIG. 7 illustrates the feature vector lookup 606, according to an example. The feature vector lookup 606 includes converting the coordinates of the ray to modified polar coordinates 702 and performing a feature vector lookup, using the modified polar coordinates 704. Converting the coordinates of the ray to modified polar coordinates 702 involves reducing the dimensionality of the coordinates, as well as eliminating ray aliasing. This reduction in dimensionality allows all rays to be uniquely identified while also doing so with a smaller amount of information than if raw coordinates (e.g., three-dimensional cartesian coordinates) were used. The feature vector lookup 704 involves using the modified polar coordinates to perform a lookup on a feature vector grid (or line) to obtain a feature vector. The feature vector includes the actual inputs for the neural network. In some examples, the feature vector has higher dimensionality than the modified polar coordinates characterizing the ray. The values of the feature vector are provided to the neural network, rather than the values of the modified polar coordinates, because using the feature vector improves the overall result and accuracy since the use of the feature vector automatically discovers a set of features that can expressively describe data, as compared with a neural network that does not use such feature vector. The values of the feature vector, themselves, can be trained through back propagation in a similar manner as with the weights of the neural network. In summary, the feature vector lookup 606 involves converting the raw coordinates of a ray to modified coordinates and performing a feature vector lookup with those modified coordinates. As described elsewhere herein, in some examples, the feature vector lookup involves looking up a set of feature vectors from a grid indexed by the modified polar coordinates. In some examples, each vertex of the grid is associated with a particular set of values for the feature vector. The modified polar coordinates specify at least one such vertex (e.g., the most proximate such vertex) and thus specify a set of such values.

Figure 8A:
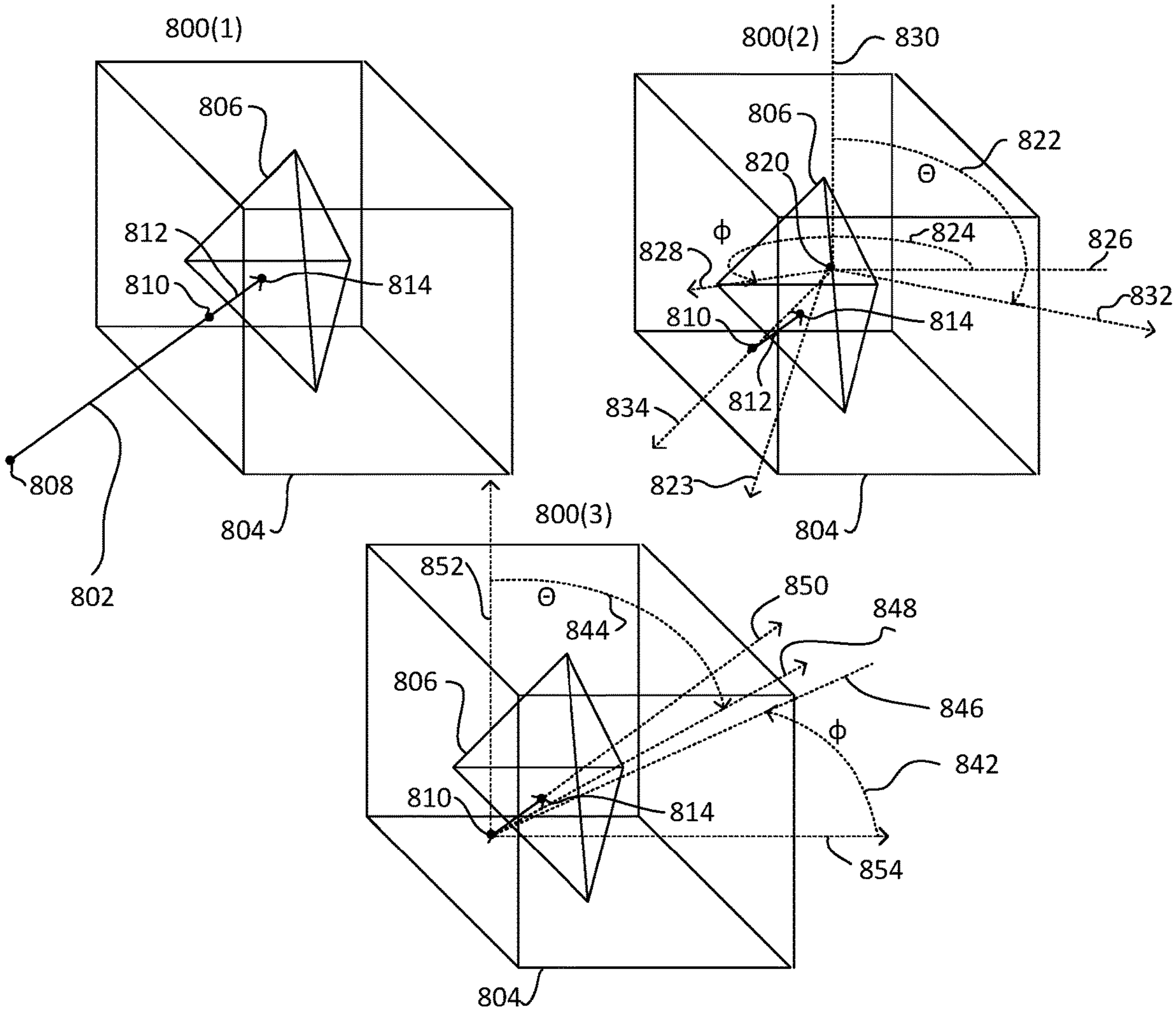
FIG. 8A illustrates the operations for converting the raw coordinates to modified polar coordinates, in the situation where the ray origin is outside of the bounding box, according to an example.

FIG. 8A illustrates the operations for converting the raw coordinates to modified polar coordinates 702, in the situation where the ray origin 810 is outside of the bounding box 804, according to an example. A first graphic 800(1) illustrates a ray 802, a bounding box 804, and a set of geometry 806. As described elsewhere herein, the ray tracing pipeline 300 begins a ray trace operation, testing the ray for intersection with geometry of a scene, for various reasons, such as upon request of a shader program (e.g., ray generation shader or, for secondary rays, from a hit shader). The ray tracing pipeline 300 tests the ray for intersection with the nodes of a BVH (e.g., BVH 404). FIG. 8A illustrates the operations after determining that the ray 802 intersects the bounding box 804 (e.g., associated with a non-leaf node N of FIG. 4). The subsequent operations include determining whether the ray intersects any of the geometry 806 (e.g., leaf nodes) enclosed by the bounding box 804. Training adjusts the neural network by determining whether the ray intersects such geometry 806 using conventional techniques (e.g., traversing through the entire BVH representing the geometry 806) and updating the weights and feature vectors according to feedback from such conventional techniques. Inference includes avoiding using the conventional techniques once the ray is determined to intersect the bounding box 804 and instead querying the neural network to determine whether the ray 802 intersects any of the geometry 806.

To convert the ray coordinates to the modified polar coordinates (702), the ray tracing pipeline 300 first shortens the ray such that the origin of the ray is at the surface of the bounding box 804. This shortening operation, illustrated in graphic 800(1), is performed so that the origin of the ray can be represented by a point on the bounding box 804, which requires two angular coordinates and no radius coordinate ("modified polar coordinates"). The radius coordinate is omitted because that coordinate is implied by the fact that such coordinate is always on the surface of the bounding box 804. In essence, this shortening operation is possible because if a ray has an origin outside of the bounding box 804 (e.g., origin 808), then all rays that pass through the intersection point of that ray with the bounding box 804 and have the same direction as the ray will have the same intersection results (i.e., will be evaluated to hit geometry inside the box 804 or to not hit geometry inside the box 804). In other words, all rays that pass through the same point on the box and propagate through the same direction can be viewed as equivalent, which is referred to as ray aliasing. In graphic 800(1), the shortened ray 812 has origin point 810 which is on the surface of the box and propagates in the same direction as the ray 802. Point 814 represents the point of intersection of the ray 802 (or ray 812) with the geometry 806.

Graphic 800(2) illustrates the manner in which the origin point of the ray is encoded as a two-dimensional polar coordinate including vertical angle Θ and horizontal angle φ, and omitting a radius as is typically included in polar coordinates. The origin of the coordinate system is the center 820 of the box 804. The origin 810 of the ray 812 is identified by an angle (represented by angle indicator 834) that extends from the center 820 through the point of intersection with the box 810. A radius, typically used in polar coordinates, is not needed, as the direction from the origin is implied, since the origin 810 of the ray 812 is always on the surface of the box 804. Thus the origin 810 of the ray 812 is defined by the point at which a line having the specified angle intersects the box 804.

The angle components of the polar coordinate are illustrated in graphic 800(2). The vertical angle Θ 822 illustrates the angle from a vertical axis 830 to a vertical direction 832 of the coordinate. This vertical direction is a direction in a plane parallel to the vertical axis 830 and the horizontal axis 826 and that is perpendicular to a depth axis 823. The horizontal angle φ 824 indicates the angle from a horizontal axis 826 to a horizontal direction 828 of the coordinate. The horizontal direction is the direction in a plane parallel to the horizontal axis 826 and depth axis 823 and perpendicular to the vertical axis 830. As can be seen, the coordinate angle 834 indicates the angle from the center 820 of the box 804 to the origin 810 of the ray.

Graphic 800(3) illustrates the coordinate for the direction of the ray. The direction coordinate extends from the origin 810 of the ray and includes two angular components—a vertical angle Θ 844 and a horizontal angle φ 842. The vertical angle 844 indicates an angle from the vertical axis 852 to a vertical direction 848 of the coordinate and the horizontal angle 842 indicates an angle from the horizontal axis 854 to a horizontal direction 846 of the coordinate, in a similar manner as in graphic 800(2). Angle 850 is the combination of the vertical angle 844 and the horizontal angle 842. Note that no radius is required.

Figure 8B:
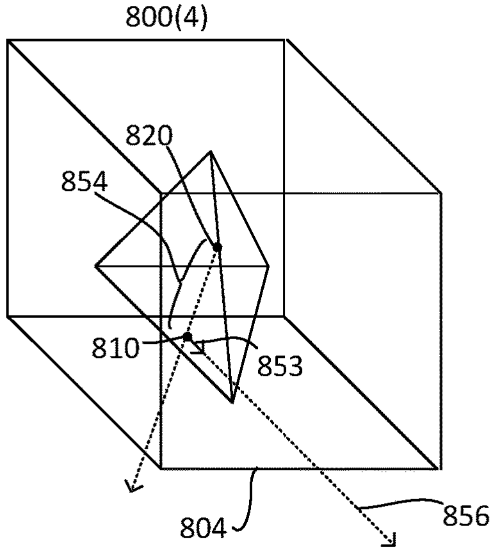
FIG. 8B illustrates operations associated with the feature vector lookup for the situation in which the origin of the ray is within the bounding box, according to an example.

FIG. 8B illustrates operations associated with the feature vector lookup for the situation in which the origin of the ray is within the bounding box 804, according to an example. The feature vector lookup in this situation utilizes two polar coordinates and a radius. Each polar coordinate is used to look up a separate grid 900 (FIG. 9) and a radius is used to lookup a feature vector on a feature vector line (a one-dimensional version of the grid 900).

In FIG. 8B, the coordinates used to perform the feature vector lookup include an origin 810, specified with a two-dimensional polar coordinate as with FIG. 8A, a direction 856, specified with a two-dimensional polar coordinate, as with FIG. 8A, and a radius 854, which is the distance from the center 820 of the bounding box 804 to the origin 810 of the ray 853. The two-dimensional origin coordinate is used to look up one feature vector grid 900, the two-dimensional direction coordinate is used to lookup a second feature vector grid 900, and the single radius is used to look up a one-dimensional line.

Figure 9:
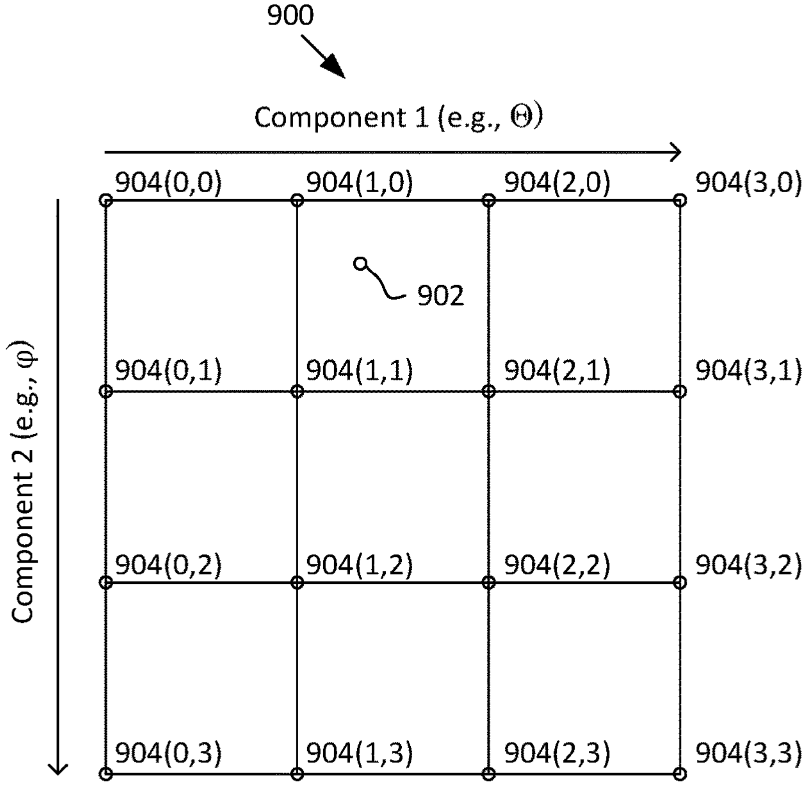
FIG. 9 illustrates operations for a feature vector lookup using modified polar coordinates, according to an example.

FIG. 9 illustrates operations for a feature vector lookup using modified polar coordinates 704, according to an example. This feature vector lookup can be used for any of the polar coordinates mentioned above, for either the origin-in-box mode or the origin-outside-box mode. The grid 900 includes a plurality of feature vector points 904, each of which is associated with a particular set of values for a feature vector. As described, the polar coordinates are two-dimensional. The feature vector lookup involves extracting one or more of the sets of feature vector values based on the location of the polar coordinate 902 on the grid 900. More specifically, the neural network engine 600 places the polar coordinate 902 on the grid 900 based on the values of the two components of the polar coordinate 902. The horizontal position on the grid 900 is associated with component 1 and the vertical position on the grid 900 is associated with component 2. Based on the location of the polar coordinate 902 on the grid 900, the neural network engine 600 derives a set of values for a corresponding feature vector. In some examples, the neural network engine 600 obtains, as the set of values, those associated with the closest point 904. In other examples, the neural network engine 600 obtains the sets associated with the four nearest points 904 and interpolates those sets based on the position of the polar coordinate 902 between those four feature vector points 904. In some examples, this interpolation involves weighting the set of values from each point based on the closeness of the coordinate 902 to the particular point 904, and summing the weighted value sets. In summary, the feature vector lookup involves obtaining a set of values or an interpolated set of values from a grid 900 correlating coordinate values to feature vector sets.

Above, it is stated that the radius for FIG. 8B is performed as a lookup for a one-dimensional feature line. Such a line would be a line that contains a number of points 904. The lookup with the radius would select one such point as the closest point to the radius value, or would interpolate between two closest points based on the distance from each such point to the radius value.

It should be understood that each grid is associated with a particular feature vector dimensionality. The dimensionality indicates the dimension of the feature vector associated with the points 904 of that grid (or line). In an example, a dimensionality of 3 means that each point 904 on the grid has a corresponding three-dimensional feature vector. This dimensionality can be any number. It should be understood that the feature vector dimensionality is not the same as the dimensionality of the coordinate used to look up the feature vector (which is, for example, 1 or 2).

Figure 10:
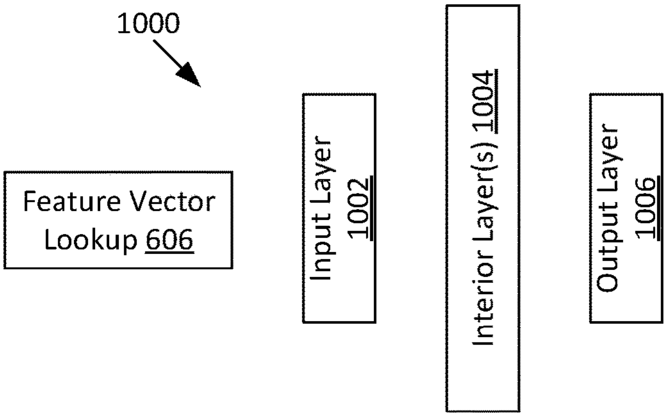
FIG. 10 illustrates an example neural network used for the training and inference, according to an example.

FIG. 10 illustrates an example neural network used for the training 608 and inference 610, according to an example. The neural network includes an input layer 1002, a set of one or more interior layers 1004, and an output layer 1006. A feature vector lookup 606, performed as described elsewhere herein, is used to generate inputs for the input layer 1002 based on characteristics of the ray being tested against geometry. During training, the neural network engine 600 adjusts the weights of the layers (input layer 1002, interior layers 1004, and output layer 1006), as well as the feature vector values for the feature vector lookup 606 (e.g., the value sets associated with each grid point 904) based on feedback received from the neural network 1000 when applying ray tracing results generating through "traditional" techniques.

More specifically, in order to perform training, the neural network engine 600 generates a bounce ray and processes the ray fully through the ray tracing pipeline 300 to generate "baseline" results. For example, the neural network engine 600 causes the ray tracing pipeline 300 to determine whether the ray intersects one or more leaf nodes, without processing the ray through the neural network 1000. Additionally, the neural network engine 600 also causes the neural network 1000 to process the ray to determine whether the ray intersects one or more leaf nodes. The neural network engine 600 trains the weights through a technique such as back propagation. Such a technique starts with the output of the neural network, comparing that result to the real result, and adjusting weights or other values to minimize a loss value. In some examples, the loss value characterizes a difference between the outputs of neurons and what such outputs "should" be according to the baseline results. In other words, the back-propagation starts at the output and works backwards through the network, adjusting weights of the neural network 1000 to cause the network to produce an answer that is closer to the "real" answer (the baseline result)—in this case, the actual result of the ray intersection test with the BVH. In addition to adjusting the weights of the neural network, the back-propagation also adjusts the feature vector values corresponding to the grid points 904 to produce more accurate results for the neural network engine 600. In any particular training iteration, for which a set of ray data is used, the adjustments made would be to the grid points 904 corresponding to that ray data. These adjustments would be made so that the accuracy of the neural network in producing an output value is improved.

For inference, the neural network engine 600 receives the feature vector obtained via the feature vector lookup 606 and applies that feature vector to the neural network 1000. Operations propagate through the neural network 1000 to produce an output value. The output value indicates whether or not the ray intersects a leaf node (e.g., a leaf node within the bounding box 804).

In some examples, the layers are fully connected. In some examples, the neural network 1000 is a multi layer perceptron. In some examples, the output layer 1006 is a sigmoid function that outputs a visibility probability between 0 and 1, indicating whether or not the ray hits geometry.

Figure 11:
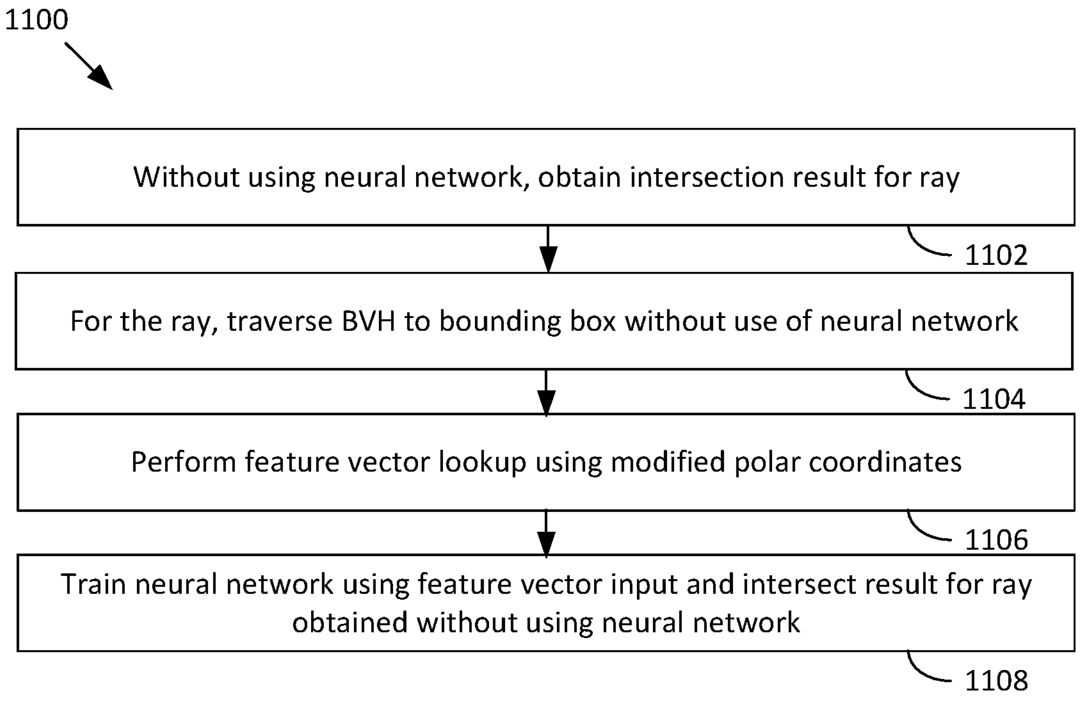
FIG. 11 is a flow diagram of a method for training a neural network to determine whether a ray intersects geometry, according to an example.

FIG. 11 is a flow diagram of a method 1100 for training a neural network to determine whether a ray intersects geometry, according to an example. Although described with respect to the system of FIGS. 1-10, those of skill in the art will recognize that any system, configured to perform the steps of the method 1100 in any technically feasible order, falls within the scope of the present disclosure.

At step 1102, a ray tracing pipeline 300 obtains an intersection result for a ray, without using a neural network. In some examples, the ray is a bounce ray, which is a ray generated as the result of a different ray (such as a camera ray) bouncing off of a different surface. Obtaining the intersect result for step 1102 is performed using the ray tracing pipeline by traversing a BVH with the ray. The intersection result indicates whether or not the ray intersects any object.

At step 1104, the ray tracing pipeline traverses the BVH to a bounding box that bounds geometry for which training is to be performed. More specifically, a set of neural networks and feature vector lookup information exists for each set of geometry within the BVH. In some examples, the set of geometry is an instance. An instance is a sub-tree of a BVH that can be used at different portions of a BVH to avoid duplication of information. More specifically, some BVHs are divided into a top-level BVH and a bottom-level BVH. The top-level BVH includes non-leaf nodes and pointers to instances. The instances are bottom-level BVHs that include non-leaf nodes and leaf nodes. Different pointers of the top-level BVH may point to the same instance (possibly with a transform such as translation, rotation, or scaling), thus reusing the information in the bottom-level BVHs and avoiding duplication. In some examples, the bounding box that bounds an instance is the bounding box 804 that bounds the geometry to be tested. In other words, in some examples, the neural network is able to evaluate whether a ray intersects the geometry of an instance. In some such instances, to perform such an evaluation, the ray tracing pipeline 300 traverses to the bounding box of an instance and then hands off evaluation to the neural network engine 600 for evaluation of the geometry of the instance. In some examples, there is a set of neural networks per instance. The set of neural networks includes one "inner" neural network for the situation where the origin of the ray is within the bounding box and an "outer" neural network for the situation where the origin of the ray is outside of the bounding box. In addition, there is one set of feature vector grids for the outer neural network and one set of feature vector grids (including the feature vector "line" for the radius) for the inner neural network. In some examples, step 1104 involves traversing to the bounding box bounding an instance node that includes such neural networks and feature vector grids.

At step 1106, the neural network engine 600 performs a feature vector lookup using modified polar coordinates. The modified polar coordinates are as described with respect to FIGS. 8A and 8B. The feature vector lookup is as described with respect to FIG. 9. At step 1108, the neural network engine 600 trains the neural network using the feature vector input (1106) and intersection result (1102) for the ray obtained without using the neural network. As described elsewhere herein, the training includes applying feedback related to the difference between the "correct" result (1102) and the result obtained from the network. The network trained depends on whether the ray origin is within the bounding box 804 or external to (or on) the bounding box 804. Training the network also includes training the feature vector grids (including line) 900 as described elsewhere herein.

Figure 12:
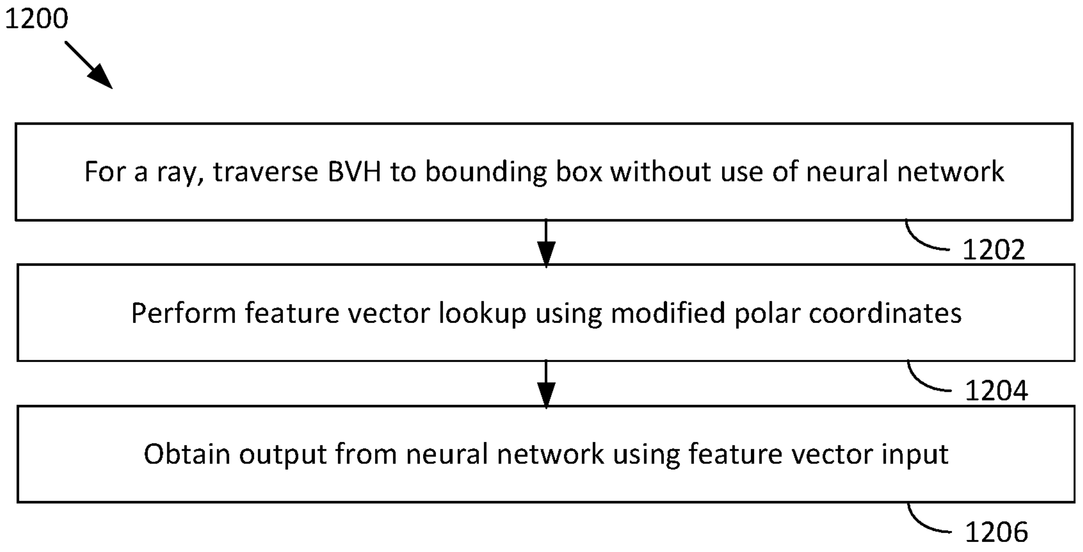
FIG. 12 is a flow diagram of a method for using a neural network to determine whether a ray intersects geometry, according to an example.

FIG. 12 is a flow diagram of a method 1200 for using a neural network to determine whether a ray intersects geometry, according to an example. Although described with respect to the system of FIGS. 1-10, those of skill in the art will recognize that any system, configured to perform the steps of the method 1100 in any technically feasible order, falls within the scope of the present disclosure.

At step 1202, a ray tracing pipeline 300 traverses to a bounding box for a ray without use of a neural network. At step 1204, a neural network engine 600 performs a feature vector lookup using modified polar coordinates (as described with respect to FIGS. 8A and 8B). At step 1206, the neural network engine 600 obtains output of a neural network using a feature vector input as described elsewhere herein. In some examples, the output indicates whether the ray is occluded.

Each of the units illustrated in the figures represents hardware circuitry configured to perform the operations described herein, software configured to perform the operations described herein, or a combination of software and hardware configured to perform the steps described herein. For example, the ray tracing pipeline 300, ray generation shader 302, any hit shader 306, miss shader 312, closest hit shader 310, acceleration structure traversal stage 304, and neural network engine 600, are implemented fully in hardware (e.g., circuitry such as any type of programmable processor circuitry and/or hard-wired circuitry), fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. The operations within the neural network engine 600 (e.g., feature vector lookup 606, training 608, inference 610, conversion 702, and feature vector lookup 704), represent operations performed by the hardware, software, or combination thereof that implements the neural network engine 600. The neural network 1000 represents a series of operations for propagating data through a neural network to obtain an output result.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

traversing a bounding volume hierarchy for a ray to arrive at a bounding box without use of a neural network;

perform a feature vector lookup using modified polar coordinates characterizing the ray relative to the bounding box to obtain a set of feature vectors, wherein the modified polar coordinates represent the ray with a starting point on surface of the bounding box using two angular coordinates and no radius coordinate; and obtaining output with the neural network using the set of feature vectors, the output indicating whether the ray is occluded.

2. The method of claim 1, wherein the bounding box is a box that bounds all contents of a bottom level bounding volume hierarchy.

3. The method of claim 1, wherein the modified polar coordinates include a first polar coordinate including a horizontal angle and a vertical angle characterizing an origin of the ray.

4. The method of claim 1, wherein the modified polar coordinates include a first polar coordinate including a horizontal angle and a vertical angle characterizing a direction of the ray.

5. The method of claim 1, wherein the feature vector lookup includes identifying one or more closest points on a feature vector grid and extracting a feature vector from the one or more closest points.

6. The method of claim 5, wherein extracting the feature vector from the one or more closest points includes interpolating between feature vectors associated with the one or more closest points.

7. The method of claim 1, further comprising classifying an origin of the ray as either within the bounding box or external to or on the bounding box, and performing the feature vector lookup based on the classifying.

8. The method of claim 7, wherein the neural network used to obtain output depends on the classifying.

9. The method of claim 1, further comprising training the neural network.

10. A system comprising:

a memory configured to store at least a portion of a bounding volume hierarchy; and a processor configured to:

traverse the bounding volume hierarchy for a ray to arrive at a bounding box without use of a neural network;

perform a feature vector lookup using modified polar coordinates characterizing the ray relative to the bounding box to obtain a set of feature vectors, wherein the modified polar coordinates represent the ray as a point on the bounding box using two angular coordinates and no radius coordinate; and obtain output with the neural network using the set of feature vectors, the output indicating whether the ray is occluded.

11. The system of claim 10, wherein the bounding box is a box that bounds all contents of a bottom level bounding volume hierarchy.

12. The system of claim 10, wherein the modified polar coordinates include a first polar coordinate including a horizontal angle and a vertical angle characterizing an origin of the ray.

13. The system of claim 10, wherein the modified polar coordinates include a first polar coordinate including a horizontal angle and a vertical angle characterizing a direction of the ray.

14. The system of claim 10, wherein the feature vector lookup includes identifying one or more closest points on a feature vector grid and extracting a feature vector from the one or more closest points.

15. The system of claim 14, wherein extracting the feature vector from the one or more closest points includes interpolating between feature vectors associated with the one or more closest points.

16. The system of claim 10, wherein the processor is further configured to classify an origin of the ray as either within the bounding box or external to or on the bounding box, and performing the feature vector lookup based on the classifying.

17. The system of claim 16, wherein the neural network used to obtain output depends on the classifying.

18. The system of claim 10, wherein the processor is further configured to train the neural network.

19. A non-transitory computer-readable medium storing instructions that, when executed by a processor, cause the processor to perform operations comprising:

traversing a bounding volume hierarchy for a ray to arrive at a bounding box without use of a neural network;

perform a feature vector lookup using modified polar coordinates characterizing the ray relative to the bounding box to obtain a set of feature vectors, wherein the modified polar coordinates represent the ray with a starting point on surface of the bounding box using two angular coordinates and no radius coordinate; and obtaining output with the neural network using the set of feature vectors, the output indicating whether the ray is occluded.

20. The non-transitory computer-readable medium of claim 19, wherein the bounding box is a box that bounds all contents of a bottom level bounding volume hierarchy.

* * * * *